UNITED STATES PATENT OFFICE.

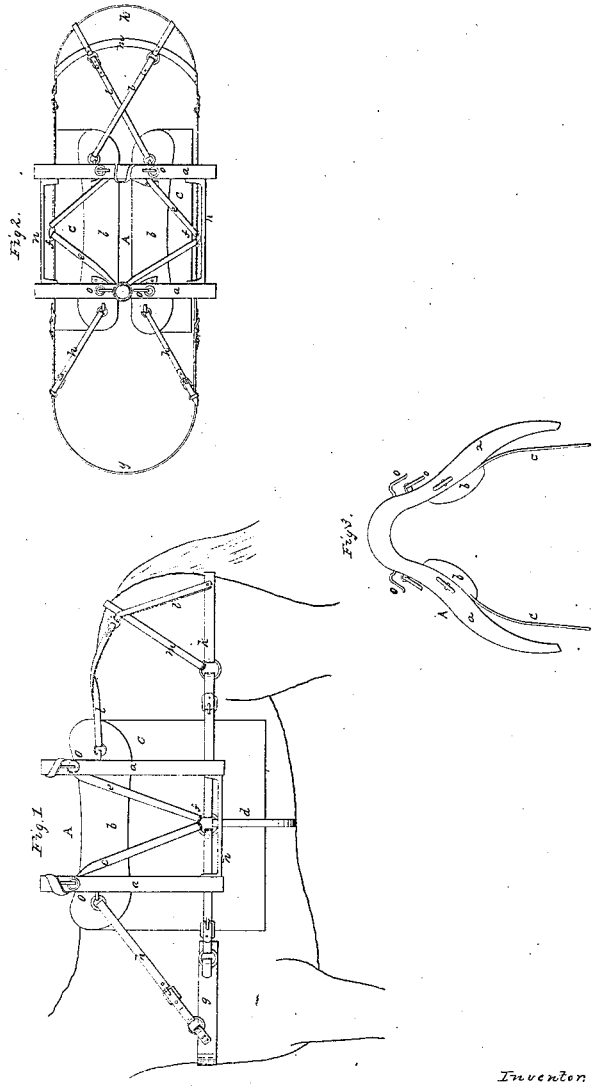

JOSEPH GOSKER AND AUGUST DEGENHART, OF CINCINNATI, OHIO.

IMPROVEMENT IN PACK-SADDLES.

Specification forming part of Letters Patent No. 39,285, dated July 21, 1863.

*To all whom it may concern:*

Be it known that we, JOSEPH GOSKER and AUGUST DEGENHART, of Cincinnati, in the county of Hamilton and State of Ohio, have invented a new and useful Improvement in Pack-Saddles; and we do hereby declare the following to be a full, clear, and exact description thereof, reference being had to the accompanying drawings and letters of reference marked thereon, forming part of this specification.

Our improvement in pack-saddles relates to the form of construction of the tree, by which the saddle, with its load, while being supported appropriately upon the back of the animal, is held off entirely from his sides, relieving him of the contracting or compressing weight which is produced by loaded saddles of the ordinary construction.

Our invention also relates to the arrangement of the straps or harness by which the saddle is held in place on the back of the animal, as will appear.

In the accompanying drawings, Figure 1 is a side elevation of our improved saddle and harness, placed appropriately on the back of an animal. Fig. 2 is a top view of the saddle and appurtenances. Fig. 3 is a front view of the saddle, showing the position of the pads and skirt, and the form of the tree by which the weight is held off and prevented from pressing inwardly upon the sides of the animal.

In the description which follows, like letters of reference indicate like parts in the different figures.

A is the saddle, consisting of the bows *a a*, pads *b b*, skirts *c c*, and girt *d*.

*e e* are straps which descend from the upper part of the bows *a*, one from each, upon each side, and, converging to a point midway between the bows, down on the sides of the animal, are secured to rings *f*, one on each side, as represented. From these rings a breast-strap, *g*, extends horizontally around the breast of the animal, stayed or supported in its position by the straps *h*, which descend obliquely from the forward end of the pads, one on each side, as shown, and from the same rings, *f*, a breeching-strap, *k*, extends around the hind quarters of the animal. This strap is held in position by diagonal straps *l l*, one of which extends from the after end of each of the pads across the back in opposite directions, and thence down to appropriate points in the breech-strap, to which they are properly secured.

*m* is an auxiliary strap extending from the breeching-strap *k* over the rump of the animal, as represented.

*n n* are stays by which the lower ends of the bows *a* are connected and braced.

*o o* represent rings and hooks upon which the packs or burdens to be carried are suspended.

By referring now to Fig. 3 it will be seen that the bows *a*, which form part of the tree, are prolonged downward a considerable distance below the pads, and that from the points where they leave the pads their form is such that they stand off from the sides of the animal, so that the packs or burdens suspended to the saddle, resting against them, are prevented from pressing upon or even touching his sides.

The arrangement of the breeching and back-straps which we have herein described obviates the necessity for a crupper, the use of which, in connection with pack-saddles carrying heavy burdens, causes great torture to the animal, and is often attended with permanent injury to affected part.

Having fully described our invention, what we claim as new, and desire to secure by Letters Patent, is the following:

1. Supporting the packs or burdens of a pack-saddle off from the sides of the animal by means of the bows *a a*, constructed and arranged substantially in the manner herein specified and shown.

2. In combination with the pack-saddle A, the arrangement of the breeching-strap *k*, diagonal straps *l l*, and auxiliary strap *m*, substantially as and for the purpose described.

3. The arrangement of the breast-strap *g* and the straps or stays *h h*, in combination with the pack-saddle A, substantially as shown and described.

JOSEPH GOSKER.
AUGUST DEGENHART.

Witnesses:
A. NORTON,
D. L. REID.